United States Patent
Shah

(10) Patent No.: US 12,355,750 B2
(45) Date of Patent: *Jul. 8, 2025

(54) UTILIZING FEDERATED USER IDENTIFIERS TO ENABLE SECURE INFORMATION SHARING

(71) Applicant: Bank of America Corporation, Charlotte, NC (US)

(72) Inventor: Hitesh Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 494 days.

This patent is subject to a terminal disclaimer.

(21) Appl. No.: 17/447,304

(22) Filed: Sep. 10, 2021

(65) Prior Publication Data

US 2022/0038451 A1 Feb. 3, 2022

Related U.S. Application Data

(63) Continuation of application No. 16/210,117, filed on Dec. 5, 2018, now Pat. No. 11,159,510.

(51) Int. Cl.
*H04L 9/40* (2022.01)
*H04L 67/06* (2022.01)
*H04L 67/55* (2022.01)

(52) U.S. Cl.
CPC ........ *H04L 63/0815* (2013.01); *H04L 63/083* (2013.01); *H04L 63/10* (2013.01);
(Continued)

(58) Field of Classification Search
CPC ... H04L 63/0815; H04L 63/083; H04L 63/10; H04L 63/20; H04L 67/06; H04L 67/55;
(Continued)

(56) References Cited

U.S. PATENT DOCUMENTS

| 3,581,414 A | 6/1971 | Crawford |
| 7,647,645 B2 | 1/2010 | Edeki et al. |

(Continued)

OTHER PUBLICATIONS

Dec. 9, 2020 (US) Notice of Allowance and Fees Due—U.S. Appl. No. 16/210,042.
Dec. 11, 20201 (US) Non-Final Office Action—U.S. Appl. No. 16/210,010.
Nov. 23, 2020 (US) Notice of Allowance and Fees Due—U.S. Appl. No. 16/210,092.

(Continued)

*Primary Examiner* — Aravind K Moorthy
(74) *Attorney, Agent, or Firm* — Banner & Witcoff, Ltd.

(57) ABSTRACT

Aspects of the disclosure relate to utilizing federated user identifiers to enable secure information sharing. A computing platform may receive, from an external application host platform, a federated login request comprising user identification information associated with a user account. Based on receiving the federated login request, the computing platform may send, to a client computing device linked to the user account, a push notification prompting a user of the client computing device to authenticate. Then, the computing platform may authenticate the user of the client computing device to the user account. Based on authenticating the user, the computing platform may generate an orchestration message directing a data hub platform to initiate a validated data transfer with the external application host platform and may send the orchestration message to the data hub platform to initiate a transfer of external information associated with the user of the client computing device.

20 Claims, 9 Drawing Sheets

(52) U.S. Cl.
CPC ............. *H04L 63/20* (2013.01); *H04L 67/06* (2013.01); *H04L 67/55* (2022.05)

(58) Field of Classification Search
CPC .. H04L 67/53; H04L 63/0838; H04L 63/0861
See application file for complete search history.

(56) References Cited

U.S. PATENT DOCUMENTS

| | | | |
|---|---|---|---|
| 8,079,079 B2 | 12/2011 | Zhang et al. | |
| 8,346,929 B1 | 1/2013 | Lai | |
| 8,509,431 B2* | 8/2013 | Schmidt | H04W 12/069 713/168 |
| 8,533,803 B2* | 9/2013 | Cha | H04W 12/069 726/8 |
| 8,544,072 B1* | 9/2013 | Masone | H04L 63/0815 726/8 |
| 8,627,438 B1* | 1/2014 | Bhimanaik | H04L 63/08 726/9 |
| 8,677,451 B1* | 3/2014 | Bhimaraju | G06F 21/41 726/8 |
| 9,203,829 B1 | 12/2015 | Evine et al. | |
| 9,396,332 B2 | 7/2016 | Abrams et al. | |
| 9,397,990 B1* | 7/2016 | Taly | H04L 63/08 |
| 9,503,452 B1* | 11/2016 | Kumar | H04L 63/0838 |
| 9,509,688 B1 | 11/2016 | Magi Shaashua et al. | |
| 9,536,072 B2 | 1/2017 | Guedalia et al. | |
| 9,628,491 B1* | 4/2017 | Jerrard-Dunne | G06F 16/9535 |
| 9,635,027 B1* | 4/2017 | Luzader | G06F 16/951 |
| 9,692,740 B2* | 6/2017 | Hitchcock | G06F 21/41 |
| 10,069,842 B1* | 9/2018 | Bradley | H04L 63/0281 |
| 10,205,717 B1* | 2/2019 | Shah | G06F 21/53 |
| 10,292,051 B2 | 5/2019 | Kusens et al. | |
| 10,333,927 B2 | 6/2019 | Hinton et al. | |
| 10,601,808 B1* | 3/2020 | Nijim | H04L 63/0815 |
| 10,771,471 B2 | 9/2020 | Enqvist et al. | |
| 10,965,683 B1* | 3/2021 | Castonguay | H04L 63/083 |
| 11,159,510 B2* | 10/2021 | Shah | H04L 63/0815 |
| 2003/0177121 A1* | 9/2003 | Moona | H04L 63/20 707/999.009 |
| 2004/0181670 A1* | 9/2004 | Thune | G06F 21/6263 713/176 |
| 2006/0064502 A1* | 3/2006 | Nagarajayya | H04L 67/54 709/237 |
| 2006/0084410 A1* | 4/2006 | Sutaria | H04W 4/24 455/408 |
| 2006/0218630 A1 | 9/2006 | Pearson et al. | |
| 2006/0223530 A1* | 10/2006 | Bumiller | H04L 67/56 455/435.1 |
| 2007/0208714 A1* | 9/2007 | Ture | G06F 21/6227 |
| 2007/0208744 A1* | 9/2007 | Krishnaprasad | H04L 63/0815 707/999.009 |
| 2007/0208746 A1* | 9/2007 | Koide | G06F 21/6218 707/999.009 |
| 2007/0209080 A1* | 9/2007 | Ture | G06F 16/951 726/28 |
| 2007/0220268 A1* | 9/2007 | Krishnaprasad | G06F 16/2455 713/182 |
| 2007/0283425 A1* | 12/2007 | Ture | G06F 16/951 726/5 |
| 2007/0289024 A1* | 12/2007 | Mohammed | G06F 21/604 726/28 |
| 2008/0021997 A1* | 1/2008 | Hinton | H04L 63/0815 709/225 |
| 2009/0089625 A1 | 4/2009 | Kannappan et al. | |
| 2009/0100136 A1* | 4/2009 | Jarenskog | G06Q 30/02 709/204 |
| 2009/0119763 A1* | 5/2009 | Park | H04L 63/0815 726/8 |
| 2009/0187974 A1* | 7/2009 | Tulshibagwale | H04L 63/20 726/4 |
| 2009/0276771 A1* | 11/2009 | Nickolov | G06Q 30/04 718/1 |
| 2009/0293108 A1* | 11/2009 | Weeden | G06F 21/41 726/6 |
| 2010/0122340 A1* | 5/2010 | Chow | G06F 16/00 726/19 |
| 2012/0233665 A1 | 9/2012 | Ranganathan et al. | |
| 2012/0260322 A1* | 10/2012 | Logan | G06F 21/33 726/6 |
| 2012/0278872 A1* | 11/2012 | Woelfel | H04L 63/0815 726/7 |
| 2012/0323686 A1 | 12/2012 | Burger et al. | |
| 2013/0117831 A1 | 5/2013 | Hook et al. | |
| 2014/0020073 A1* | 1/2014 | Ronda | H04L 63/0853 726/7 |
| 2014/0040993 A1 | 2/2014 | Lorenzo et al. | |
| 2014/0101055 A1* | 4/2014 | Grissom | G06Q 20/36 705/41 |
| 2014/0101723 A1* | 4/2014 | Wilkes | G06F 21/00 726/4 |
| 2014/0153706 A1* | 6/2014 | Boone, Jr. | H04M 11/066 379/93.01 |
| 2014/0250511 A1* | 9/2014 | Kendall | G06F 21/44 726/6 |
| 2014/0337053 A1* | 11/2014 | Smith | H04L 63/0815 705/3 |
| 2014/0337513 A1* | 11/2014 | Amalapurapu | G06Q 30/0269 709/224 |
| 2015/0052587 A1 | 2/2015 | O'Neill et al. | |
| 2015/0254450 A1* | 9/2015 | Ravi | H04L 63/126 726/8 |
| 2015/0256337 A1* | 9/2015 | Nguyen | H04L 67/141 713/171 |
| 2015/0347765 A1* | 12/2015 | Hankins, Jr. | H04L 63/20 726/26 |
| 2016/0092870 A1* | 3/2016 | Salama | G06Q 20/3226 705/44 |
| 2016/0094546 A1 | 3/2016 | Innes et al. | |
| 2016/0239649 A1 | 8/2016 | Zhao | |
| 2016/0277481 A1* | 9/2016 | Yang | G06Q 20/407 |
| 2016/0307194 A1* | 10/2016 | Bhatnagar | H04L 63/0838 |
| 2016/0308845 A1* | 10/2016 | Quinlan | H04L 9/3247 |
| 2016/0381080 A1 | 12/2016 | Reddem et al. | |
| 2017/0041296 A1 | 2/2017 | Ford et al. | |
| 2017/0048252 A1* | 2/2017 | Straub | H04L 67/02 |
| 2017/0068934 A1* | 3/2017 | Bos | G06Q 10/1097 |
| 2017/0078225 A1* | 3/2017 | Pandey | H04L 51/046 |
| 2017/0142080 A1* | 5/2017 | Hill | G06F 21/45 |
| 2017/0149770 A1* | 5/2017 | Hinton | H04L 63/10 |
| 2017/0227995 A1 | 8/2017 | Lee et al. | |
| 2017/0230344 A1* | 8/2017 | Dhar | H04L 9/088 |
| 2017/0244757 A1* | 8/2017 | Castinado | H04L 63/10 |
| 2017/0317993 A1 | 11/2017 | Weber et al. | |
| 2017/0331816 A1 | 11/2017 | Votaw et al. | |
| 2017/0346821 A1* | 11/2017 | Yedidi | H04L 63/0876 |
| 2018/0007553 A1 | 1/2018 | Dutt et al. | |
| 2018/0020009 A1* | 1/2018 | Wei | H04L 63/123 |
| 2018/0063122 A1* | 3/2018 | Enoki | H04L 63/0815 |
| 2018/0077568 A1* | 3/2018 | Young | H04L 63/083 |
| 2018/0131685 A1* | 5/2018 | Sridhar | H04L 9/3226 |
| 2018/0139111 A1* | 5/2018 | Lugiai | H04L 67/141 |
| 2018/0139199 A1* | 5/2018 | Ahuja | H04L 67/306 |
| 2018/0145830 A1* | 5/2018 | Henretty | H04L 9/3263 |
| 2018/0164959 A1* | 6/2018 | Gupta | G06Q 10/109 |
| 2018/0167816 A1 | 6/2018 | Kusens et al. | |
| 2018/0183586 A1* | 6/2018 | Bhargav-Spantzel | G06F 21/32 |
| 2018/0234464 A1 | 8/2018 | Sim et al. | |
| 2018/0249285 A1 | 8/2018 | Shaw et al. | |
| 2018/0249292 A1 | 8/2018 | Skaaksrud | |
| 2018/0251132 A1 | 9/2018 | Phelan | |
| 2018/0253682 A1 | 9/2018 | Gilman et al. | |
| 2018/0253713 A1 | 9/2018 | Ready et al. | |
| 2018/0253718 A1 | 9/2018 | Khan et al. | |
| 2018/0253840 A1 | 9/2018 | Tran | |
| 2018/0254101 A1 | 9/2018 | Gilmore et al. | |
| 2018/0255000 A1 | 9/2018 | Castinado et al. | |
| 2018/0255060 A1 | 9/2018 | Bansal | |
| 2018/0255084 A1 | 9/2018 | Kotinas et al. | |
| 2018/0255422 A1 | 9/2018 | Montemurro et al. | |

(56) References Cited

U.S. PATENT DOCUMENTS

| | | |
|---|---|---|
| 2018/0255456 A1 | 9/2018 | Yin et al. |
| 2018/0260384 A1 | 9/2018 | Pasupalak et al. |
| 2018/0260553 A1 | 9/2018 | Hoyos et al. |
| 2018/0260641 A1 | 9/2018 | Yadhunandan et al. |
| 2018/0260743 A1 | 9/2018 | Block et al. |
| 2018/0261060 A1 | 9/2018 | Siminoff et al. |
| 2018/0261126 A1 | 9/2018 | Rios et al. |
| 2018/0262388 A1 | 9/2018 | Johnson et al. |
| 2018/0262529 A1 | 9/2018 | Allen |
| 2018/0262597 A1 | 9/2018 | Matthieu et al. |
| 2018/0262620 A1 | 9/2018 | Wolthuis et al. |
| 2018/0262810 A1 | 9/2018 | Cronk et al. |
| 2018/0262909 A1 | 9/2018 | Rotter et al. |
| 2018/0264347 A1 | 9/2018 | Tran et al. |
| 2018/0268015 A1 | 9/2018 | Sugaberry |
| 2018/0268408 A1 | 9/2018 | Botros et al. |
| 2018/0268632 A1 | 9/2018 | Malhotra |
| 2018/0268674 A1 | 9/2018 | Siminoff |
| 2018/0268691 A1 | 9/2018 | Meredith et al. |
| 2018/0268818 A1 | 9/2018 | Schoenmackers et al. |
| 2018/0268944 A1 | 9/2018 | Prakash |
| 2018/0269554 A1 | 9/2018 | Sanford |
| 2018/0269927 A1 | 9/2018 | Gerszberg et al. |
| 2018/0270276 A9 | 9/2018 | Logue et al. |
| 2018/0270549 A1 | 9/2018 | Awiszus et al. |
| 2018/0270608 A1 | 9/2018 | Thoresen et al. |
| 2018/0270612 A1 | 9/2018 | Thoresen et al. |
| 2018/0274876 A1 | 9/2018 | Stewart et al. |
| 2018/0275765 A1 | 9/2018 | Roth et al. |
| 2018/0276041 A1 | 9/2018 | Bansal et al. |
| 2018/0276205 A1 | 9/2018 | Auger |
| 2018/0276261 A1 | 9/2018 | Smart |
| 2018/0276495 A1 | 9/2018 | Yu et al. |
| 2018/0276710 A1 | 9/2018 | Tietzen et al. |
| 2018/0278496 A1 | 9/2018 | Kulshreshtha et al. |
| 2018/0278597 A1 | 9/2018 | Helms et al. |
| 2018/0278648 A1 | 9/2018 | Li et al. |
| 2018/0278740 A1 | 9/2018 | Choi et al. |
| 2018/0300391 A1* | 10/2018 | San Vicente ............ H04L 51/48 |
| 2018/0301148 A1 | 10/2018 | Roman et al. |
| 2018/0301149 A1 | 10/2018 | Roman et al. |
| 2018/0302284 A1 | 10/2018 | Roman et al. |
| 2018/0302285 A1 | 10/2018 | Roman et al. |
| 2018/0302362 A1 | 10/2018 | Abedini et al. |
| 2018/0302363 A1 | 10/2018 | Abedini et al. |
| 2018/0302418 A1 | 10/2018 | Scasny |
| 2018/0302420 A1 | 10/2018 | Nakanelua et al. |
| 2018/0302423 A1 | 10/2018 | Muddu et al. |
| 2018/0302425 A1 | 10/2018 | Esman, Sr. et al. |
| 2018/0307303 A1 | 10/2018 | Powderly et al. |
| 2018/0307399 A1 | 10/2018 | Sandilya et al. |
| 2018/0307908 A1 | 10/2018 | O'Brien et al. |
| 2018/0307909 A1 | 10/2018 | O'Brien et al. |
| 2018/0308073 A1 | 10/2018 | Kurian et al. |
| 2018/0308100 A1 | 10/2018 | Haukioja et al. |
| 2018/0308473 A1 | 10/2018 | Scholar |
| 2018/0309752 A1 | 10/2018 | Villavicencio et al. |
| 2018/0310159 A1 | 10/2018 | Katz et al. |
| 2018/0314689 A1 | 11/2018 | Wang et al. |
| 2018/0315110 A1 | 11/2018 | Kannan et al. |
| 2018/0315499 A1 | 11/2018 | Appelbaum et al. |
| 2018/0316852 A1 | 11/2018 | Graham et al. |
| 2018/0317146 A1 | 11/2018 | Fitzpatrick |
| 2018/0320967 A1 | 11/2018 | Kaloudis et al. |
| 2018/0321185 A1 | 11/2018 | Bantas et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0322419 A1 | 11/2018 | Bugenhagen |
| 2018/0322436 A1 | 11/2018 | Sotiroudas et al. |
| 2018/0322879 A1 | 11/2018 | Bhaya et al. |
| 2018/0322961 A1 | 11/2018 | Kim et al. |
| 2018/0326150 A1 | 11/2018 | Davis et al. |
| 2018/0326291 A1 | 11/2018 | Tran et al. |
| 2018/0329738 A1 | 11/2018 | Kasha et al. |
| 2018/0329744 A1 | 11/2018 | Shear et al. |
| 2018/0330000 A1 | 11/2018 | Noble et al. |
| 2018/0330059 A1 | 11/2018 | Bates et al. |
| 2018/0330248 A1 | 11/2018 | Burhanuddin et al. |
| 2018/0330417 A1 | 11/2018 | Wollmer et al. |
| 2018/0332132 A1 | 11/2018 | Sampath et al. |
| 2018/0335776 A1 | 11/2018 | Theis et al. |
| 2018/0336638 A1 | 11/2018 | Dziabiak et al. |
| 2018/0336639 A1 | 11/2018 | Dziabiak et al. |
| 2018/0336640 A1 | 11/2018 | Dziabiak et al. |
| 2018/0336641 A1 | 11/2018 | Dziabiak et al. |
| 2018/0336905 A1 | 11/2018 | Kim et al. |
| 2018/0337966 A1 | 11/2018 | Pearl et al. |
| 2018/0338120 A1 | 11/2018 | Lemberger et al. |
| 2018/0338330 A1 | 11/2018 | Ledvina et al. |
| 2018/0349581 A1* | 12/2018 | Ramalingam ......... H04L 9/0891 |
| 2018/0359238 A1* | 12/2018 | Appiah ................ H04L 63/0853 |
| 2018/0359242 A1* | 12/2018 | Appiah ................. G06F 9/4451 |
| 2019/0020646 A1* | 1/2019 | Magyar .................... G06F 21/41 |
| 2019/0028462 A1* | 1/2019 | Ishikawa ............... H04L 63/102 |
| 2019/0057386 A1* | 2/2019 | Fazeli ................... H04L 63/102 |
| 2019/0058706 A1* | 2/2019 | Feijoo ................. H04L 63/0815 |
| 2019/0098503 A1 | 3/2019 | Dutt et al. |
| 2019/0158497 A1* | 5/2019 | Diaz Cuellar ........ H04L 63/108 |
| 2019/0166112 A1* | 5/2019 | Gordon ................. H04L 63/083 |
| 2019/0166485 A1* | 5/2019 | Namiranian ............ H04L 63/02 |
| 2019/0190704 A1* | 6/2019 | Srivastava .............. H04L 63/08 |
| 2019/0220583 A1 | 7/2019 | Douglas et al. |
| 2019/0245848 A1* | 8/2019 | Divoux ............... H04L 63/0815 |
| 2019/0332691 A1* | 10/2019 | Beadles ............. G06Q 20/3829 |
| 2019/0372968 A1 | 12/2019 | Balogh et al. |
| 2019/0392162 A1* | 12/2019 | Stern ................... G06F 21/6245 |
| 2020/0007530 A1 | 1/2020 | Mohamad Abdul et al. |
| 2020/0162454 A1* | 5/2020 | Jain ..................... H04L 63/0853 |
| 2020/0184048 A1 | 6/2020 | Toth et al. |
| 2020/0184049 A1 | 6/2020 | Toth et al. |
| 2020/0184050 A1 | 6/2020 | Toth et al. |
| 2020/0184051 A1 | 6/2020 | Toth et al. |
| 2020/0184065 A1 | 6/2020 | Toth et al. |
| 2020/0186518 A1 | 6/2020 | Shah |
| 2020/0235933 A1* | 7/2020 | Redkokashin ......... G06Q 50/01 |

OTHER PUBLICATIONS

Dec. 7, 2020 (US) Notice of Allowance and Fees Due—U.S. Appl. No. 16/210,028.
"Baseline Information Security Standard," University of Colorado Office of Information Security, revised Sep. 12, 2013, retrieved from https://www.cu.edu/security/system-wide-baseline-security-standards, 28 pages.
Aug. 4, 2020 (US) Non-Final Office Action—U.S. Appl. No. 16/210,028.
Dec. 11, 2020 (US) Notice of Allowance and Fees Due—U.S. Appl. No. 16/210,062.
Mar. 10, 2021—(US) Notice of Allowance—U.S. Appl. No. 16/210,092.
May 4, 2021 (US) Notice of Allowance and Fees Due—U.S. Appl. No. 16/210,010.
Mar. 24, 2021 (US) Notice of Allowance and Fees Due—U.S. Appl. No. 16/210,028.
Jul. 1, 2021—(US) Notice of Allowance—U.S. Appl. No. 16/210,028.
Jun. 30, 2021—(US) Notice of Allowance—U.S. Appl. No. 16/210,042.
Sep. 15, 2022—(US) Non-Final Office Action—U.S. Appl. No. 17/317,979.
Dec. 19, 2022—(US) Notice of Allowance—U.S. Appl. No. 17/332,557.
Jan. 20, 2023—(US) Non-Final Office Action—U.S. Appl. No. 17/498,317.
Mar. 13, 2023—(US) Notice of Allowance—U.S. Appl. No. 17/332,557.
Jun. 20, 2023—(US) Notice of Allowance—U.S. Appl. No. 17/317,979.
Jun. 28, 2023—(US) Notice of Allowance—U.S. Appl. No. 17/332,557.
Jun. 13, 2023—(US) Notice of Allowance—U.S. Appl. No. 17/498,317.

* cited by examiner

UTILIZING FEDERATED USER IDENTIFIERS TO ENABLE SECURE INFORMATION SHARING

CROSS REFERENCE TO RELATED APPLICATIONS

This application is a continuation of and claims priority to U.S. application Ser. No. 16/210,117, filed Dec. 5, 2018, and entitled "Utilizing Federated User Identifiers to Enable Secure Information Sharing," which is incorporated herein by reference in its entirety.

BACKGROUND

Aspects of the disclosure relate to providing information security and preventing unauthorized access to resources of an information system. In particular, one or more aspects of the disclosure relate to preventing unauthorized access to information resources by utilizing federated user identifiers to enable secure information sharing.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by utilizing federated user identifiers to enable secure information sharing.

In accordance with one or more embodiments, a computing platform having at least one processor, a communication interface, and memory may receive, via the communication interface, from an external application host platform, a first federated login request comprising first user identification information associated with a first user account. Based on receiving the first federated login request comprising the first user identification information associated with the first user account, the computing platform may send, via the communication interface, to a first client computing device linked to the first user account, a first push notification prompting a user of the first client computing device to authenticate. Subsequently, the computing platform may authenticate the user of the first client computing device to the first user account. Based on authenticating the user of the first client computing device to the first user account, the computing platform may generate an orchestration message directing a data hub platform to initiate a validated data transfer with the external application host platform. Then, the computing platform may send, via the communication interface, to the data hub platform, the orchestration message directing the data hub platform to initiate the validated data transfer with the external application host platform. In addition, sending the orchestration message directing the data hub platform to initiate the validated data transfer with the external application host platform may cause the data hub platform to initiate a transfer of external information associated with the user of the first client computing device and maintained on at least one external data source server from the at least one external data source server to the external application host platform.

In some embodiments, sending the first push notification prompting the user of the first client computing device to authenticate may cause the first client computing device linked to the first user account to present a notification prompting the user of the first client computing device to login to a client portal hosted by an account portal computing platform.

In some embodiments, sending the first push notification prompting the user of the first client computing device to authenticate may cause the first client computing device linked to the first user account to present a notification prompting the user of the first client computing device to login to a mobile application associated with a client portal hosted by an account portal computing platform.

In some embodiments, authenticating the user of the first client computing device to the first user account may include validating one or more of a username received from the user of the first client computing device, a password received from the user of the first client computing device, a one-time passcode received from the user of the first client computing device, biometric input received from the user of the first client computing device, or security question input received from the user of the first client computing device.

In some embodiments, prior to generating the orchestration message directing the data hub platform to initiate the validated data transfer with the external application host platform, the computing platform may send, via the communication interface, to the first client computing device linked to the first user account, a second push notification prompting the user of the first client computing device to consent to user-specific information being shared with the external application host platform.

In some embodiments, after sending the orchestration message directing the data hub platform to initiate the validated data transfer with the external application host platform, the computing platform may initiate a transfer of internal information associated with the user of the first client computing device to the external application host platform.

In some embodiments, a first portion of the internal information associated with the user of the first client computing device may be maintained on an account portal computing platform. In addition, initiating the transfer of the internal information associated with the user of the first client computing device to the external application host platform may include: generating at least one command directing the account portal computing platform to send the first portion of the internal information associated with the user of the first client computing device to the external application host platform; and sending, via the communication interface, to the account portal computing platform, the at least one command directing the account portal computing platform to send the first portion of the internal information associated with the user of the first client computing device to the external application host platform.

In some embodiments, a second portion of the internal information associated with the user of the first client computing device may be maintained on enterprise server infrastructure. In addition, initiating the transfer of the internal information associated with the user of the first client computing device to the external application host platform may include: generating at least one command directing the enterprise server infrastructure to send the second portion of the internal information associated with the user of the first client computing device to the external application host platform; and sending, via the communication interface, to the enterprise server infrastructure, the at least one command directing the enterprise server infrastructure to send the second portion of the internal information associated with the user of the first client computing device to the external application host platform.

In some embodiments, the internal information associated with the user of the first client computing device may include entity verification data attesting to successful authentication of the user of the first client computing device to the first user account by the computing platform. In some embodiments, the internal information associated with the user of the first client computing device may include registered contact information associated with the user of the first client computing device. In some embodiments, the internal information associated with the user of the first client computing device may include account information associated with the user of the first client computing device. In some embodiments, the internal information associated with the user of the first client computing device may include historical information associated with the user of the first client computing device. In some embodiments, the internal information associated with the user of the first client computing device may include timing information associated with the user of the first client computing device.

In some embodiments, after sending the orchestration message directing the data hub platform to initiate the validated data transfer with the external application host platform, the computing platform may update a subscription database to indicate that user-specific data associated with the first user account has been shared with the external application host platform.

In some embodiments, updating the subscription database to indicate that the user-specific data associated with the first user account has been shared with the external application host platform may cause an account portal computing platform to provide at least one subscription manager interface to the first client computing device. In some embodiments, the at least one subscription manager interface provided to the first client computing device may include a user-selectable option to revoke access to the user-specific data associated with the first user account from the external application host platform.

In some embodiments, the computing platform may receive, via the communication interface, from the external application host platform, a second federated login request comprising second user identification information associated with a second user account. Subsequently, the computing platform may determine that the second user account is hosted by a second organization different from a first organization that hosts the first user account. Based on determining that the second user account is hosted by the second organization different from the first organization that hosts the first user account, the computing platform may route the second federated login request comprising the second user identification information associated with the second user account to an authentication server associated with the second organization via the data hub platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to implementing federated user identifiers linked to online banking. For example, a user may start in a first third-party application and make a selection to initiate a request or transaction. Instead of filling out a form in the first third-party application, the user may select to sign in with a bank-managed federated identifier. The user may enter their phone number, which may trigger a push notification to be sent to the user's device (e.g., via a centralized hub server associated with the bank). The push notification may prompt the user to open their mobile banking application and authenticate. Once the user is authenticated, the mobile banking application may prompt the user to consent to share their bank data, along with third-party data associated with at least a second third-party entity (e.g., credit score, mobile phone data, or the like), with the first third-party providing the first third-party application. Subsequently, the mobile banking application may trigger and/or orchestrate a transfer of validated data (e.g., from one or more bank servers and/or second third-party servers to one or more first third-party servers) via the centralized hub server. Then, the user may complete the request or transaction in the first third-party application without further data entry and/or identity verification. In some instances, a subscription manager feature may be layered on top of this technology to enable the user to unsubscribe from one or more automatically detected subscriptions associated with recurring charges to the user's account(s).

Figure 1A:
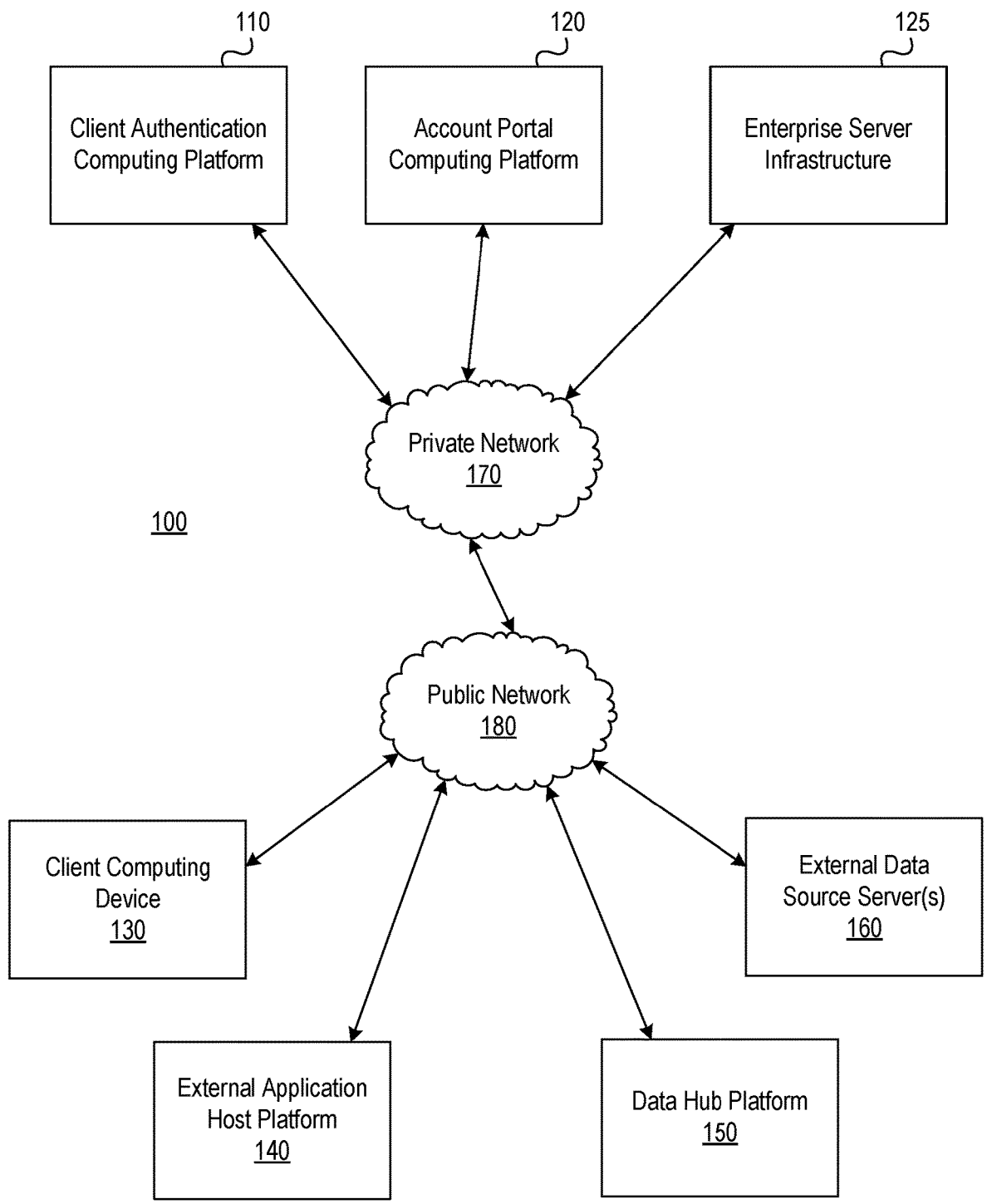
FIGS. 1A and 1B depict an illustrative computing environment for utilizing federated user identifiers to enable secure information sharing in accordance with one or more example embodiments.
Figure 1B:
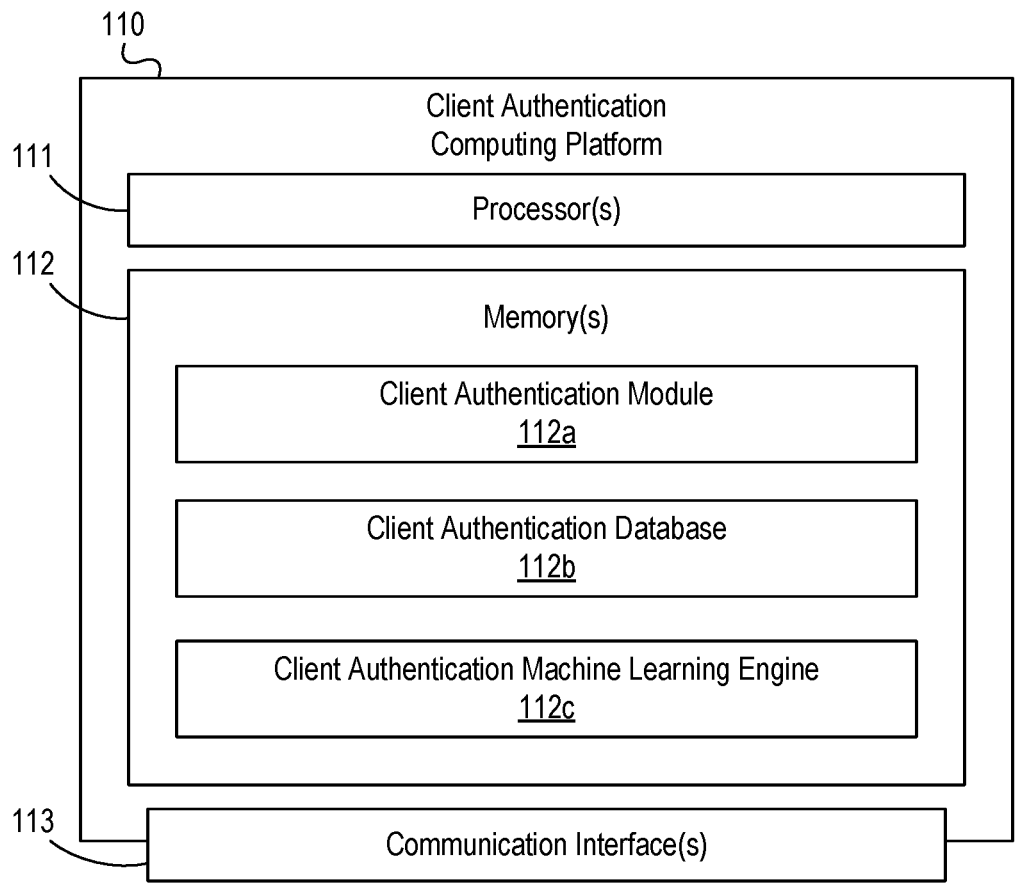

FIGS. 1A and 1B depict an illustrative computing environment for utilizing federated user identifiers to enable secure information sharing in accordance with one or more example embodiments. Referring to FIG. 1A, computing environment 100 may include one or more computer systems. For example, computing environment 100 may include a client authentication computing platform 110, an account portal computing platform 120, enterprise server infrastructure 125, a client computing device 130, an external application host platform 140, a data hub platform 150, and at least one external data source server 160.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Account portal computing platform 120 may include one or more computing devices and/or other computer components (e.g., processors, memories, communication interfaces). In addition, and as illustrated in greater detail below, account portal computing platform 120 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by account portal computing platform 120 may be associated with a client portal provided by an organization, such as an online banking portal or a mobile banking portal provided by a financial institution. Such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Enterprise server infrastructure 125 may include one or more computing devices and/or other computer components (e.g., processors, memories, communication interfaces). In addition, and as illustrated in greater detail below, enterprise server infrastructure 125 may be configured to provide various enterprise and/or back-office computing functions for an organization, such as a financial institution. For example, enterprise server infrastructure 125 may include various servers and/or databases that store and/or otherwise maintain account information, such as financial account information including account balances, transaction history, account owner information, and/or other information. In addition, enterprise server infrastructure 125 may process and/or otherwise execute transactions on specific accounts based on commands and/or other information received from account portal computing platform 120 and/or other computer systems included in computing environment 100.

Client computing device 130 may be a personal computing device (e.g., desktop computer, laptop computer) or mobile computing device (e.g., smartphone, tablet). In addition, client computing device 130 may be linked to and/or used by a specific user (e.g., of a client portal provided by account portal computing platform 120).

External application host platform 140 may include one or more computing devices and/or other computer components (e.g., processors, memories, communication interfaces). In addition, and as illustrated in greater detail below, external application host platform 140 may be configured to provide a hosted web application and/or other web services to various users, including the user of client computing device 130. The hosted web application and/or other web services provided by external application host platform 140 may be provided by and/or otherwise associated with an entity different from an organization operating client authentication computing platform 110, account portal computing platform 120, and/or enterprise server infrastructure 125. For instance, client authentication computing platform 110, account portal computing platform 120, and/or enterprise server infrastructure 125 may be operated by and/or otherwise associated with a financial institution, and external application host platform 140 may be operated by and/or otherwise associated with a third-party service provider (e.g., an internet service provider, a mobile telephone provider, a vacation rental company, or another type of company) different from the financial institution.

Data hub platform 150 may include one or more computing devices and/or other computer components (e.g., processors, memories, communication interfaces). In addition, and as illustrated in greater detail below, data hub platform 150 may be configured to orchestrate and/or otherwise execute data transfers from various source servers to various target servers, where the source servers and target servers are associated with different entities. In some instances, data hub platform 150 may operate as a central hub server that facilitates information sharing between different financial institutions (which may, e.g., include a financial institution operating client authentication computing platform 110, account portal computing platform 120, and/or enterprise server infrastructure 125) and/or other entities (e.g., internet service providers, mobile telephone providers, vacation rental companies, and/or other types of organizations) based on federated identifiers that are created, validated, and/or authenticated by the each financial institution of the different financial institutions.

External data source server 160 may include one or more computing devices and/or other computer components (e.g., processors, memories, communication interfaces). In addition, and as illustrated in greater detail below, external data source server 160 may be configured to transfer and/or otherwise share information with other servers and/or external application host platform 140 based on orchestration requests received from data hub platform 150.

Computing environment 100 also may include one or more networks, which may interconnect one or more of client authentication computing platform 110, account portal computing platform 120, enterprise server infrastructure 125, client computing device 130, external application host platform 140, data hub platform 150, and/or external data source server 160. For example, computing environment 100 may include a private network 170 (which may, e.g., interconnect client authentication computing platform 110, account portal computing platform 120, enterprise server infrastructure 125, and/or one or more other systems which may be associated with an organization, such as a financial institution) and public network 180 (which may, e.g., interconnect client computing device 130, external application host platform 140, data hub platform 150, and external data source server 160 with private network 170 and/or one or more other systems, public networks, sub-networks, and/or the like).

In one or more arrangements, client computing device 130, external application host platform 140, data hub platform 150, external data source server 160, and/or the other systems included in computing environment 100 may be any type of computing device capable of receiving a user interface, receiving input via the user interface, and communicating the received input to one or more other computing devices. For example, client computing device 130, external application host platform 140, data hub platform 150, external data source server 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, account portal computing platform 120, enterprise server infrastructure 125, client computing device 130, external application host platform 140, data hub platform 150, and external data source server 160 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a, a client authentication database 112b, and a client authentication machine learning engine 112c. Client authentication module 112a may have instructions that direct and/or cause client authentication computing platform 110 to control access to resources of an information system by utilizing federated user identifiers to enable secure information sharing, as discussed in greater detail below. Client authentication database 112b may store information used by client authentication module 112a and/or client authentication computing platform 110 in controlling access to resources of an information system by utilizing federated user identifiers to enable secure information sharing and/or in performing other functions. Client authentication machine learning engine 112c may build and/or update one or more authentication models, one or more machine-learned user profiles, and/or one or more other machine-learned models based on captured and/or received data.

Figure 2A:
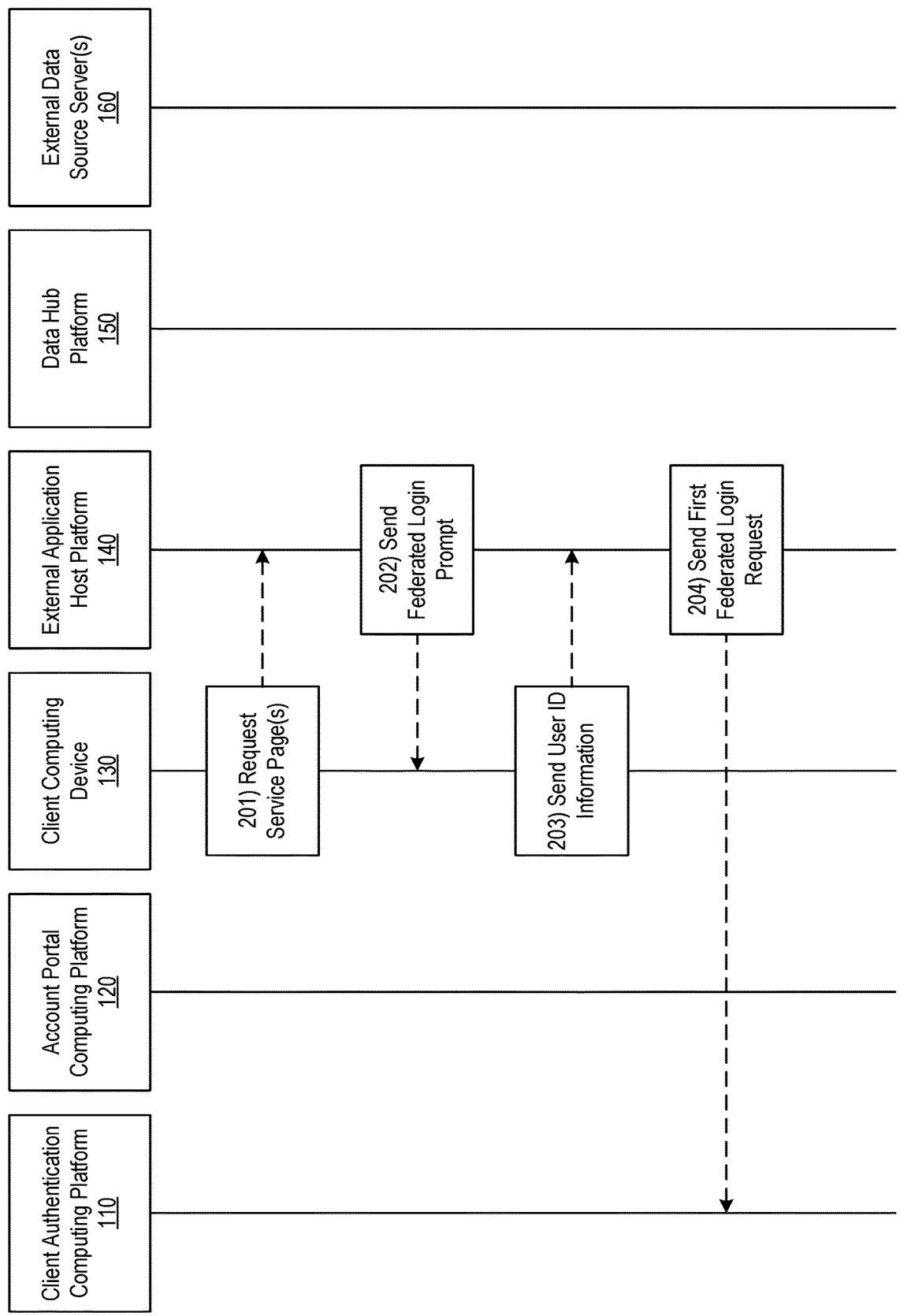
FIGS. 2A-2D depict an illustrative event sequence for utilizing federated user identifiers to enable secure information sharing in accordance with one or more example embodiments.

FIGS. 2A-2D depict an illustrative event sequence for utilizing federated user identifiers to enable secure information sharing in accordance with one or more example embodiments. Referring to FIG. 2A, at step 201, client computing device 130 may request one or more service pages and/or other application pages from external application host platform 140. For instance, external application host platform 140 may be operated by and/or otherwise associated with a third-party service provider (e.g., an internet service provider, a mobile telephone provider, a vacation rental company, or another type of company), and client computing device 130 may request one or more pages associated with a hosted web application and/or other web services provided by external application host platform 140 so as to access and/or utilize services of the third-party service provider associated with external application host platform 140.

At step 202, external application host platform 140 may send a federated login prompt to client computing device 130. For example, at step 202, in response to receiving the request for one or more service pages and/or other application pages from client computing device 130, external application host platform 140 may generate and/or send one or more user interfaces to client computing device 130 that prompt a user of client computing device 130 to provide one or more federated login credentials to login and subsequently access the one or more service pages and/or other application pages.

At step 203, client computing device 130 may send user identification information to external application host platform 140. For example, at step 203, client computing device 130 may send user identification information to external application host platform 140 in response to the federated login prompt received from external application host platform 140.

At step 204, external application host platform 140 may send a first federated login request to client authentication computing platform 110. For example, at step 204, after receiving the user identification information from client computing device 130, external application host platform 140 may send the received user identification information and/or other information to client authentication computing platform 110 (e.g., to authenticate the user of client computing device 130 to a user account that is maintained by an organization operating client authentication computing platform 110 and that is associated with the received user identification information, so as to enable information sharing, as illustrated below).

Figure 2B:
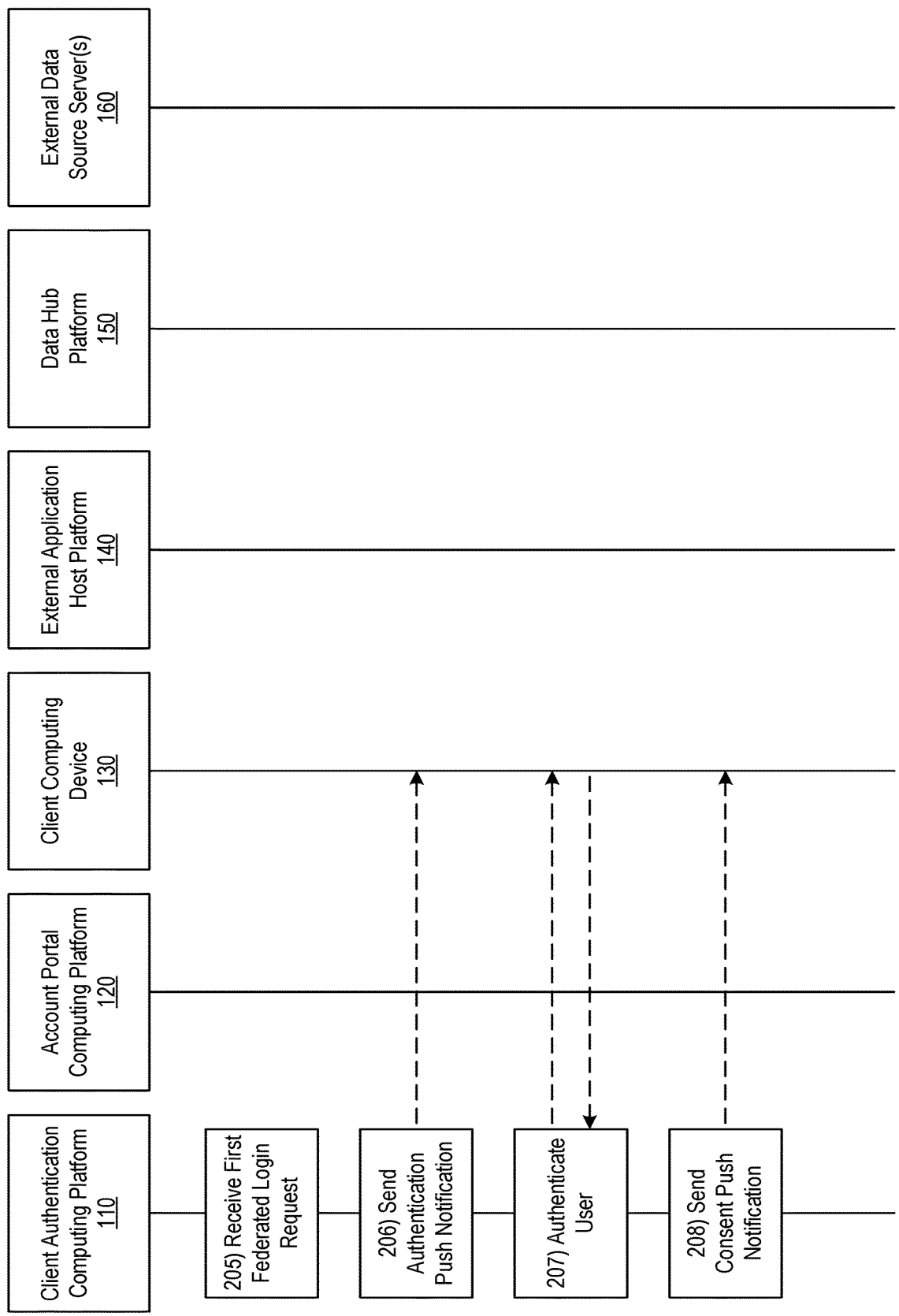

Referring to FIG. 2B, at step 205, client authentication computing platform 110 may receive the first federated login request from external application host platform 140. For example, at step 205, client authentication computing platform 110 may receive, via the communication interface (e.g., communication interface 113), from an external application host platform (e.g., external application host platform 140), a first federated login request comprising first user identification information associated with a first user account. For instance, external application host platform 140 may be operated by and/or otherwise associated with an entity different from the organization operating client authentication computing platform 110, such as a vacation rental company different from a financial institution operating client authentication computing platform 110. In addition, the user of client computing device 130 may have started in an application and/or web interface provided by external application host platform 140 to sign up for and/or otherwise request services from the organization operating external application host platform 140, and the user of client computing device 130 may have entered identification information that is validated by and/or otherwise associated with the financial institution operating client authentication computing platform 110, so as to use a federated login identifier provided by the financial institution operating client authentication computing platform 110 with the service and/or entity associated with external application host platform 140. In some instances, the service provided by external application host platform 140 and/or the entity associated with external application host platform 140 may be a subscription service to which the user of client computing device 130 is subscribing, such as a software subscription service, a home services subscription service, or the like, and the financial institution operating client authentication computing platform 110 may provide interfaces and/or other tools for managing the subscription once information sharing is enabled, as discussed in greater detail below. In some instances, the first user identification information associated with the first user account (which may, e.g., be received by client authentication computing platform 110 at step 205) may be and/or include a mobile telephone number associated with the user of client computing device 130, an online banking username, one or more other unique identifiers and/or credentials, or the like.

At step 206, client authentication computing platform 110 may send an authentication push notification to client computing device 130. For example, at step 206, based on receiving the first federated login request comprising the first user identification information associated with the first user account, client authentication computing platform 110 may send, via the communication interface (e.g., communication interface 113), to a first client computing device (e.g., client computing device 130) linked to the first user account, a first push notification prompting a user of the first client computing device (e.g., client computing device 130) to authenticate.

In some embodiments, sending the first push notification prompting the user of the first client computing device to authenticate may cause the first client computing device linked to the first user account to present a notification prompting the user of the first client computing device to login to a client portal hosted by an account portal computing platform. For example, by sending the first push notification prompting the user of the first client computing device (e.g., client computing device 130) to authenticate at step 206, client authentication computing platform 110 may cause the first client computing device (e.g., client computing device 130) linked to the first user account to present a notification prompting the user of the first client computing device (e.g., client computing device 130) to login to a client portal hosted by an account portal computing platform (e.g., account portal computing platform 120). For instance, client authentication computing platform 110 may cause client computing device 130 to display and/or otherwise present a prompt asking the user of client computing device 130 to login to an online banking portal hosted by account portal computing platform 120.

Figure 3:
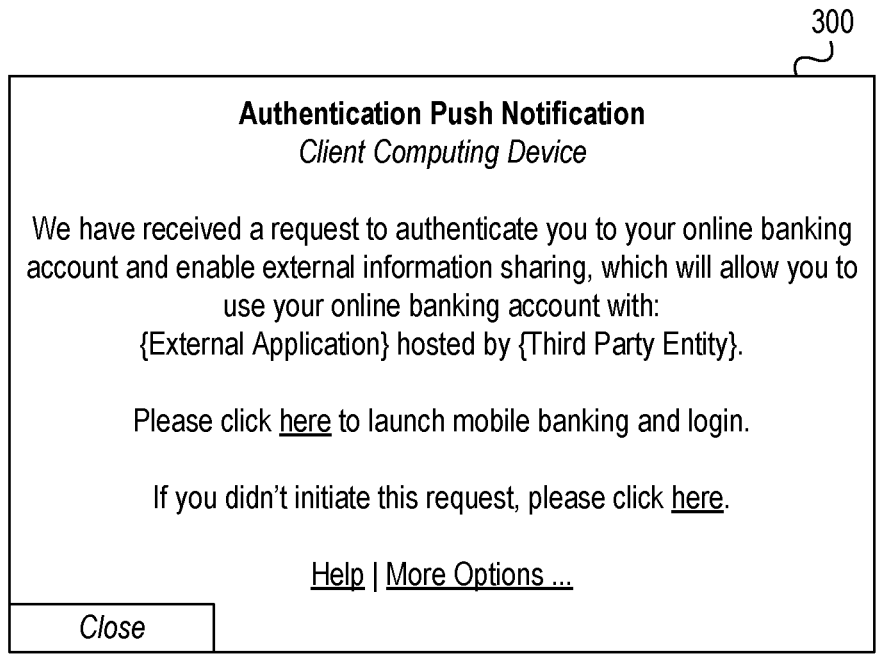
FIGS. 3-6 depict example graphical user interfaces for utilizing federated user identifiers to enable secure information sharing in accordance with one or more example embodiments.

In some embodiments, sending the first push notification prompting the user of the first client computing device to authenticate may cause the first client computing device linked to the first user account to present a notification prompting the user of the first client computing device to login to a mobile application associated with a client portal hosted by an account portal computing platform. For example, by sending the first push notification prompting the user of the first client computing device (e.g., client computing device 130) to authenticate at step 206, client authentication computing platform 110 may cause the first client computing device (e.g., client computing device 130) linked to the first user account to present a notification prompting the user of the first client computing device (e.g., client computing device 130) to login to a mobile application associated with a client portal hosted by an account portal computing platform (e.g., account portal computing platform 120). For instance, client authentication computing platform 110 may cause client computing device 130 to display and/or otherwise present a prompt asking the user of client computing device 130 to login to a mobile banking application associated with the online banking portal hosted by account portal computing platform 120. In some instances, in sending such a notification to client computing device 130, client authentication computing platform 110 may cause client computing device 130 to display and/or otherwise present a graphical user interface similar to graphical user interface 300, which is illustrated in FIG. 3. As seen in FIG. 3, graphical user interface 300 may include text and/or other information associated with the federated login request and the associated data sharing (e.g., "We have received a request to authenticate you to your online banking account and enable external information sharing, which will allow you to use your online banking account with: {External Application} hosted by {Third Party Entity}.") as well as information prompting the user to authenticate (e.g., "Please click here to launch mobile banking and login. If you didn't initiate this request, please click here.").

At step 207, client authentication computing platform 110 may authenticate the user of client computing device 130. For example, at step 207, client authentication computing platform 110 may authenticate the user of the first client computing device (e.g., client computing device 130) to the first user account. In some embodiments, authenticating the user of the first client computing device to the first user account may include validating one or more of a username received from the user of the first client computing device, a password received from the user of the first client computing device, a one-time passcode received from the user of the first client computing device, biometric input received from the user of the first client computing device, or security question input received from the user of the first client computing device. For example, in authenticating the user of the first client computing device (e.g., client computing device 130) to the first user account, client authentication computing platform 110 may validate one or more of a username received from the user of the first client computing device (e.g., client computing device 130), a password received from the user of the first client computing device (e.g., client computing device 130), a one-time passcode received from the user of the first client computing device (e.g., client computing device 130), biometric input received from the user of the first client computing device (e.g., client computing device 130), and/or security question input received from the user of the first client computing device (e.g., client computing device 130). The biometric input received from the user of client computing device 130 may include fingerprint biometrics, voice biometrics, face biometrics, cadence biometrics, and/or other biometrics, and may include actual biometric data captured by client computing device 130 and/or data indicating that the biometric data captured by client computing device 130 was locally validated on client computing device 130 by client computing device 130.

Figure 4:
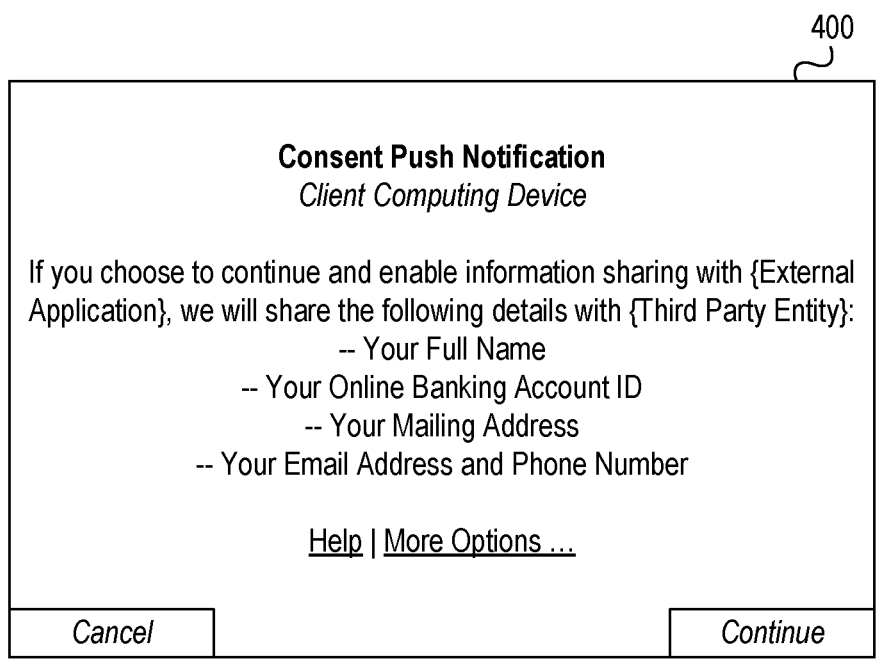

At step 208, client authentication computing platform 110 may send a consent push notification to client computing device 130. For example, at step 208, client authentication computing platform 110 may send, via the communication interface (e.g., communication interface 113), to the first client computing device (e.g., client computing device 130) linked to the first user account, a second push notification prompting the user of the first client computing device (e.g., client computing device 130) to consent to user-specific information being shared with the external application host platform (e.g., external application host platform 140). For instance, before generating an orchestration message directing data hub platform 150 to initiate a validated data transfer with external application host platform 140, client authentication computing platform 110 may prompt the user of client computing device 130 to consent to data sharing. In some instances, in sending such a notification to client computing device 130, client authentication computing platform 110 may cause client computing device 130 to display and/or otherwise present a graphical user interface similar to graphical user interface 400, which is illustrated in FIG. 4. As seen in FIG. 4, graphical user interface 400 may include text and/or other information describing the data sharing that may result from completion of the federated login request (e.g., "If you choose to continue and enable information sharing with {External Application}, we will share the following details with {Third Party Entity}: —Your Full Name—Your Online Banking Account ID—Your Mailing Address—Your Email Address and Phone Number") as well as one or more selectable controls and/or other information prompting the user to consent (e.g., "Cancel; Continue"). In some instances, client authentication computing platform 110 may wait to receive an affirmative response to the consent prompt from the user of client computing device 130 before the event sequence proceeds. Alternatively, if the user does not provide consent, client authentication computing platform 110 may generate and/or send one or more error messages, and the example event sequence may end.

Figure 2C:
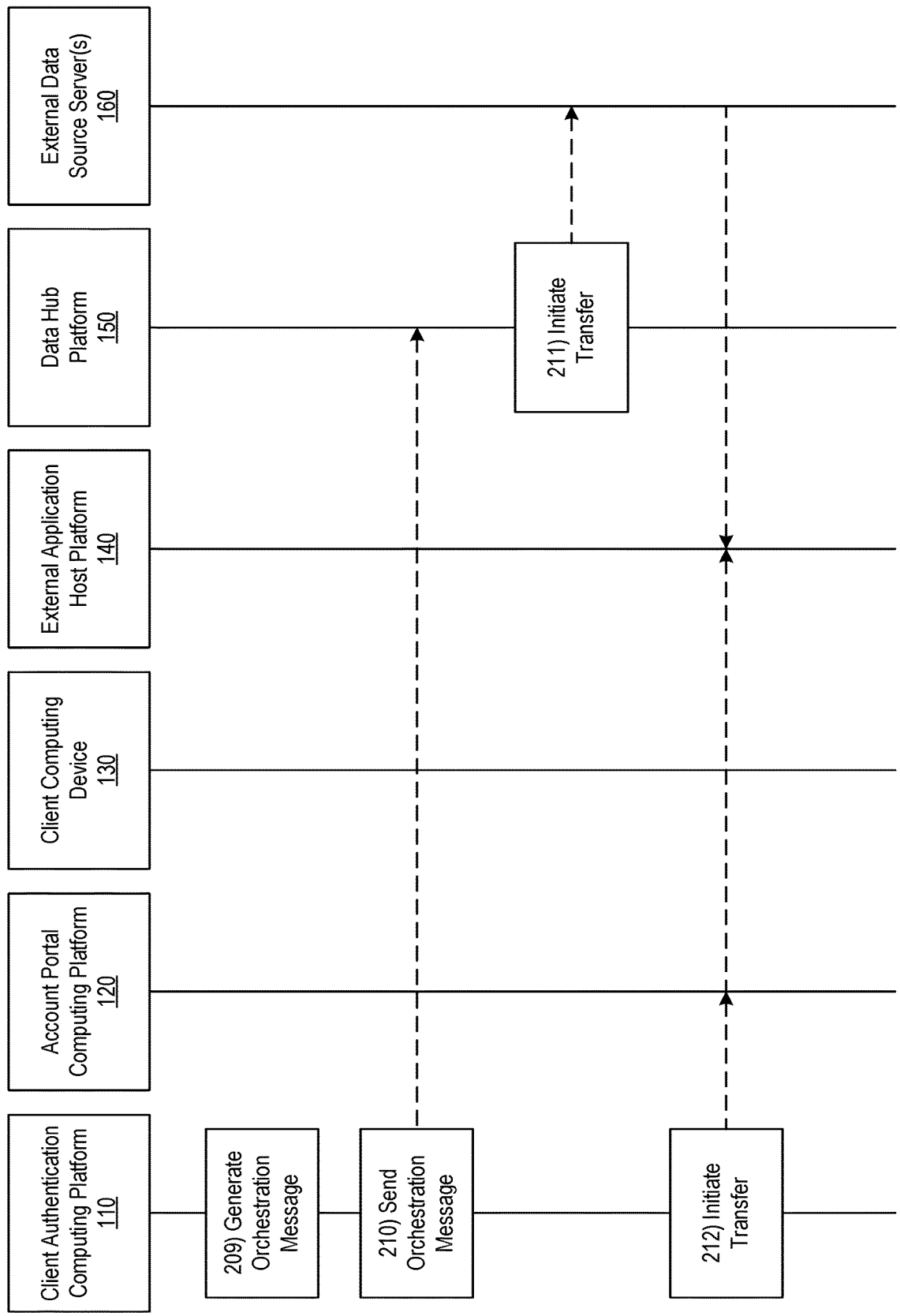

Referring to FIG. 2C, at step 209, client authentication computing platform 110 may generate an orchestration message. For example, at step 209, based on authenticating the user of the first client computing device (e.g., client computing device 130) to the first user account, client authentication computing platform 110 may generate an orchestration message directing a data hub platform (e.g., data hub platform 150) to initiate a validated data transfer with the external application host platform (e.g., external application host platform 140). For instance, the orchestration message generated by client authentication computing platform 110 may include information indicating that a specific user was successfully authenticated by client authentication computing platform 110, that information with the specific user's account is to be transferred to a particular target server (e.g., external application host platform 140) from one or more particular sources (e.g., account portal computing platform 120, enterprise server infrastructure 125, external data source server 160), and/or other information.

At step 210, client authentication computing platform 110 may send the orchestration message to data hub platform 150. For example, at step 210, client authentication computing platform 110 may send, via the communication interface (e.g., communication interface 113), to the data hub platform (e.g., data hub platform 150), the orchestration message directing the data hub platform (e.g., data hub platform 150) to initiate the validated data transfer with the external application host platform (e.g., external application host platform 140). In addition, by sending the orchestration message directing the data hub platform (e.g., data hub platform 150) to initiate the validated data transfer with the external application host platform (e.g., external application host platform 140), client authentication computing platform 110 may cause the data hub platform (e.g., data hub platform 150) to initiate a transfer of external information that is associated with the user of the first client computing device (e.g., client computing device 130) and that is maintained on at least one external data source server (e.g., external data source server 160) from the at least one external data source server (e.g., external data source server 160) to the external application host platform (e.g., external application host platform 140). For instance, by sending the orchestration message, client authentication computing platform 110 may trigger the sharing of external, third-party data (which may, e.g., be obtained from external data source server 160) with external application host platform 140, as well as the sharing of internal, organization-maintained data (which may, e.g., be obtained account portal computing platform 120 and/or enterprise server infrastructure 125) with external application host platform 140. In addition, this data sharing may be initiated based on the authentication that occurred at client authentication computing platform 110, and the user of client computing device 130 may be able to complete a request (e.g., a request for service, a transaction, or the like) on one or more pages associated with a hosted web application and/or other web services provided by external application host platform 140 without having to provide further authentication credentials and/or data entry to external application host platform 140.

At step 211, data hub platform 150 may initiate a transfer of external information from external data source server 160 to external application host platform 140. For example, at step 211, data hub platform 150 may generate and/or send one or more commands to external data source server 160, based on the orchestration message received from client authentication computing platform 110, to initiate a transfer of external information from external data source server 160 to external application host platform 140. For instance, the orchestration message received from external data source server 160 may identify the user account and/or other details corresponding to the user of client computing device 130, and the one or more commands generated by data hub platform 150 and sent by data hub platform 150 to external data source server 160 may identify this user account, the target server(s) for the data transfer (e.g., external application host platform 140) associated with the user account, and/or other information associated with the data sharing.

At step 212, client authentication computing platform 110 may initiate a transfer of internal information to external application host platform 140. For example, at step 212, after sending the orchestration message directing the data hub platform (e.g., data hub platform 150) to initiate the validated data transfer with the external application host platform (e.g., external application host platform 140), client authentication computing platform 110 may initiate a transfer of internal information associated with the user of the first client computing device (e.g., client computing device 130) to the external application host platform (e.g., external application host platform 140).

In some embodiments, a first portion of the internal information associated with the user of the first client computing device may be maintained on an account portal computing platform. In addition, initiating the transfer of the internal information associated with the user of the first client computing device to the external application host platform may include: generating at least one command directing the account portal computing platform to send the first portion of the internal information associated with the user of the first client computing device to the external application host platform; and sending, via the communication interface, to the account portal computing platform, the at least one command directing the account portal computing platform to send the first portion of the internal information associated with the user of the first client computing device to the external application host platform. For example, a first portion of the internal information associated with the user of the first client computing device (e.g., client computing device 130) may be maintained on an account portal computing platform (e.g., account portal computing platform 120). In addition, in initiating the transfer of the internal information associated with the user of the first client computing device (e.g., client computing device 130) to the external application host platform (e.g., external application host platform 140) at step 212, client authentication computing platform 110 may generate at least one command directing the account portal computing platform (e.g., account portal computing platform 120) to send the first portion of the internal information associated with the user of the first client computing device (e.g., client computing device 130) to the external application host platform (e.g., external application host platform 140). Then, client authentication computing platform 110 may send, via the communication interface (e.g., communication interface 113), to the account portal computing platform (e.g., account portal computing platform 120), the at least one command directing the account portal computing platform (e.g., account portal computing platform 120) to send the first portion of the internal information associated with the user of the first client computing device (e.g., client computing device 130) to the external application host platform (e.g., external application host platform 140).

In some embodiments, a second portion of the internal information associated with the user of the first client computing device may be maintained on enterprise server infrastructure. In addition, initiating the transfer of the internal information associated with the user of the first client computing device to the external application host platform may include: generating at least one command directing the enterprise server infrastructure to send the second portion of the internal information associated with the user of the first client computing device to the external application host platform; and sending, via the communication interface, to the enterprise server infrastructure, the at least one command directing the enterprise server infrastructure to send the second portion of the internal information associated with the user of the first client computing device to the external application host platform. For example, a second portion of the internal information associated with the user of the first client computing device (e.g., client computing device 130) may be maintained on enterprise server infrastructure (e.g., enterprise server infrastructure 125). In addition, in initiating the transfer of the internal information associated with the user of the first client computing device (e.g., client computing device 130) to the external application host platform (e.g., external application host platform 140) at step 212, client authentication computing platform 110 may generate at least one command directing the enterprise server infrastructure (e.g., enterprise server infrastructure 125) to send the second portion of the internal information associated with the user of the first client computing device (e.g., client computing device 130) to the external application host platform (e.g., external application host platform 140). Then, client authentication computing platform 110 may send, via the communication interface (e.g., communication interface 113), to the enterprise server infrastructure (e.g., enterprise server infrastructure 125), the at least one command directing the enterprise server infrastructure (e.g., enterprise server infrastructure 125) to send the second portion of the internal information associated with the user of the first client computing device (e.g., client computing device 130) to the external application host platform (e.g., external application host platform 140).

In some embodiments, the internal information associated with the user of the first client computing device may include entity verification data attesting to successful authentication of the user of the first client computing device to the first user account by the computing platform. For example, the internal information (which may, e.g., be transferred to external application host platform 140) associated with the user of the first client computing device (e.g., client computing device 130) may include entity verification data attesting to successful authentication of the user of the first client computing device (e.g., client computing device 130) to the first user account by the computing platform (e.g., client authentication computing platform 110). Such internal information may, for instance, be generated and/or sent by client authentication computing platform 110 to external application host platform 140 based on successfully authenticating the user of client computing device 130 at step 207. In addition, this information may, for instance, include a registered and/or validated name of a client associated with the user account, a unique customer identifier associated with the user account (e.g., an account number, a social security number, or the like), and/or other information.

In some embodiments, the internal information associated with the user of the first client computing device may include registered contact information associated with the user of the first client computing device. For example, the internal information (which may, e.g., be transferred to external application host platform 140) associated with the user of the first client computing device (e.g., client computing device 130) may include registered contact information associated with the user of the first client computing device (e.g., client computing device 130). Such internal information may, for instance, include a mobile telephone number associated with the user of client computing device 130, an email address associated with the user of client computing device 130, a mailing address associated with the user of client computing device 130, and/or other information associated with the user of client computing device 130 (which may, e.g., maintained by a financial institution operating client authentication computing platform 110).

In some embodiments, the internal information associated with the user of the first client computing device may include account information associated with the user of the first client computing device. For example, the internal information (which may, e.g., be transferred to external application host platform 140) associated with the user of the first client computing device (e.g., client computing device 130) may include account information associated with the user of the first client computing device (e.g., client computing device 130). Such account information may, for instance, include one or more account numbers associated with the user of client computing device 130, account balance information associated with the user of client computing device 130, and/or other information associated with one or more financial accounts maintained by a financial institution operating client authentication computing platform 110 for the user of client computing device 130.

In some embodiments, the internal information associated with the user of the first client computing device may include historical information associated with the user of the first client computing device. For example, the internal information (which may, e.g., be transferred to external application host platform 140) associated with the user of the first client computing device (e.g., client computing device 130) may include historical information associated with the user of the first client computing device (e.g., client computing device 130). Such historical information may, for instance, include relationship history information associated with the user of client computing device 130 (e.g., identifying how long the user of client computing device 130 has been a customer of a financial institution operating client authentication computing platform 110), credit history information associated with the user of client computing device 130, transaction history information associated with the user of client computing device 130, and/or other information associated with the user of client computing device 130.

In some embodiments, the internal information associated with the user of the first client computing device may include timing information associated with the user of the first client computing device. For example, the internal information (which may, e.g., be transferred to external application host platform 140) associated with the user of the first client computing device (e.g., client computing device 130) may include timing information associated with the user of the first client computing device (e.g., client computing device 130). Such timing information may, for instance, include information identifying how recently the user of client computing device 130 last updated their account information and/or contact information, one or more confidence scores identifying a predicted accuracy of the internal information based on how recently the user of client computing device 130 last updated their account information and/or contact information, and/or other information associated with the user of client computing device 130.

Figure 2D:
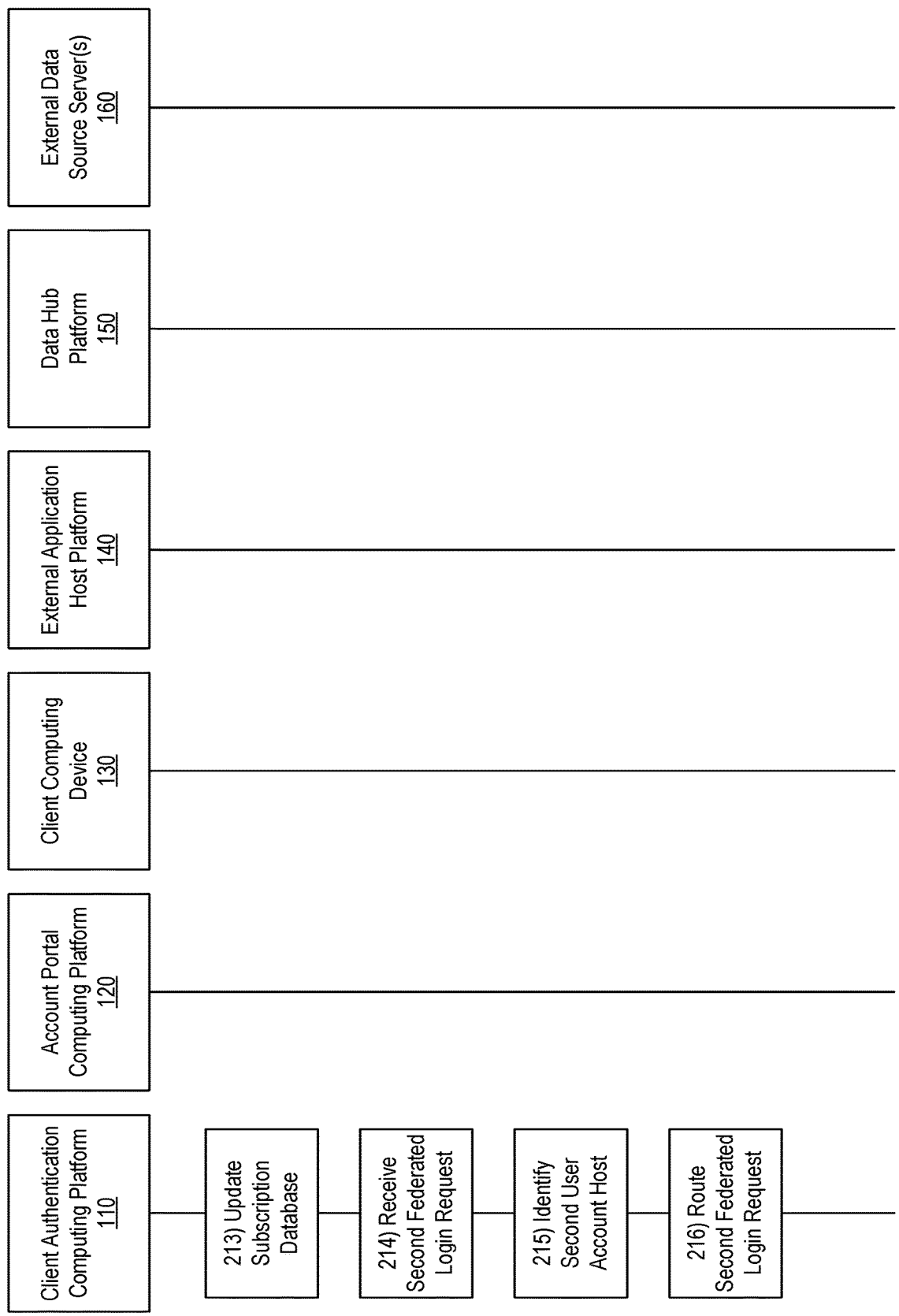

Referring to FIG. 2D, at step 213, client authentication computing platform 110 may update a subscription database. For example, at step 213, after sending the orchestration message directing the data hub platform (e.g., data hub platform 150) to initiate the validated data transfer with the external application host platform (e.g., external application host platform 140), client authentication computing platform 110 may update a subscription database to indicate that user-specific data associated with the first user account has been shared with the external application host platform (e.g., external application host platform 140). The subscription database may, for instance, be maintained by one or more of client authentication computing platform 110, account portal computing platform 120, and/or enterprise server infrastructure 125 and may link the user account with the a corresponding subscription account associated with external application host platform 140 and/or the third-party entity operating external application host platform 140.

Figure 5:
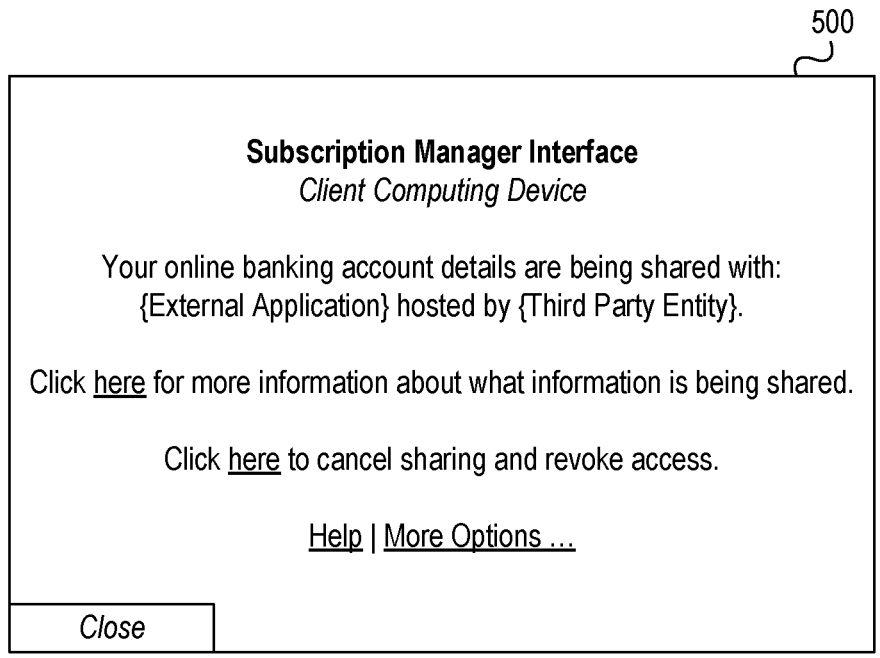

In some embodiments, updating the subscription database to indicate that the user-specific data associated with the first user account has been shared with the external application host platform may cause an account portal computing platform to provide at least one subscription manager interface to the first client computing device. For example, by updating the subscription database to indicate that the user-specific data associated with the first user account has been shared with the external application host platform (e.g., external application host platform 140) at step 213, client authentication computing platform 110 may cause an account portal computing platform (e.g., account portal computing platform 120) to provide at least one subscription manager interface to the first client computing device (e.g., client computing device 130). Such a subscription manager interface may, for instance, include a list of active subscriptions associated with the first user account, including the new subscription associated with external application host platform 140. In some instances, in causing the account portal computing platform (e.g., account portal computing platform 120) to provide at least one subscription manager interface to the first client computing device (e.g., client computing device 130), client authentication computing platform 110 may cause client computing device 130 to display and/or otherwise present a graphical user interface similar to graphical user interface 500, which is illustrated in FIG. 5. As seen in FIG. 5, graphical user interface 500 may include text and/or other information associated with the subscription and the corresponding data sharing (e.g., "Your online banking account details are being shared with: {External Application} hosted by {Third Party Entity}.") as well as one or more user-selectable controls allowing the user of client computing device 130 to manage the subscription and the corresponding data sharing (e.g., "Click here for more information about what information is being shared. Click here to cancel sharing and revoke access.").

Figure 6:
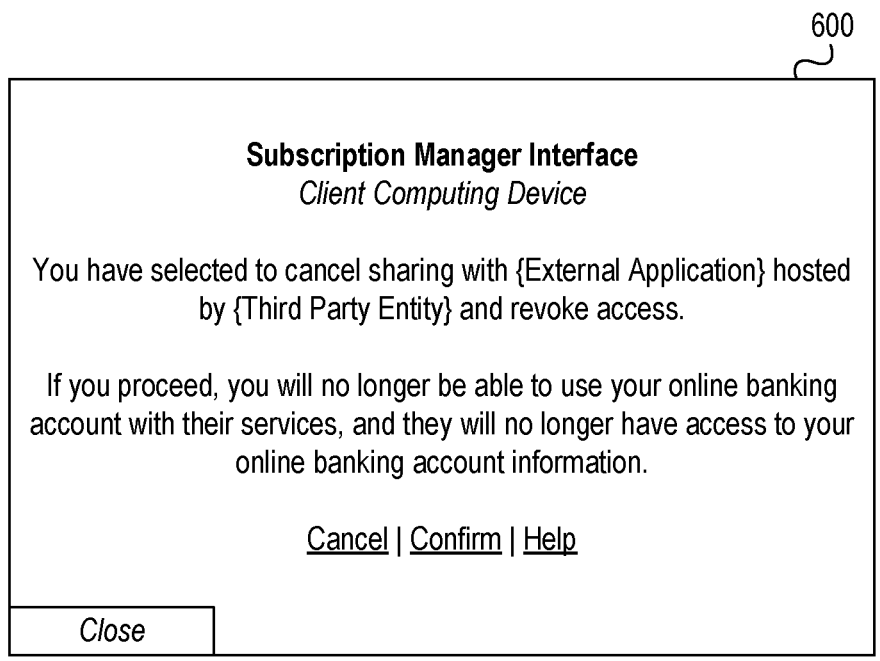

In some embodiments, the at least one subscription manager interface provided to the first client computing device may include a user-selectable option to revoke access to the user-specific data associated with the first user account from the external application host platform. For example, the at least one subscription manager interface provided to the first client computing device (e.g., client computing device 130) may include a user-selectable option to revoke access to the user-specific data associated with the first user account from the external application host platform (e.g., external application host platform 140) as seen in FIG. 5. In some instances, in causing the account portal computing platform (e.g., account portal computing platform 120) to provide at least one subscription manager interface to the first client computing device (e.g., client computing device 130), and responsive to receiving a user selection of the user-selectable option to revoke access to the user-specific data associated with the first user account from the external application host platform (e.g., external application host platform 140), client authentication computing platform 110 may cause client computing device 130 to display and/or otherwise present a graphical user interface similar to graphical user interface 600, which is illustrated in FIG. 6. As seen in FIG. 6, graphical user interface 600 may include text and/or other information associated with revoking the subscription and the corresponding data sharing (e.g., "You have selected to cancel sharing with {External Application} hosted by {Third Party Entity} and revoke access. If you proceed, you will no longer be able to use your online banking account with their services, and they will no longer have access to your online banking account information.") as well as one or more user-selectable controls allowing the user of client computing device 130 to proceed or cancel with revoking the subscription and the corresponding data sharing (e.g., "Cancel | Confirm | Help").

Subsequently, client authentication computing platform 110 may continue to receive and/or process other federated login requests received from external application host platform 140 and/or other authentication requests. For instance, at step 214, client authentication computing platform 110 may receive a second federated login request from external application host platform 140. For example, at step 214, client authentication computing platform 110 may receive, via the communication interface (e.g., communication interface 113), from the external application host platform (e.g., external application host platform 140), a second federated login request comprising second user identification information associated with a second user account.

At step 215, client authentication computing platform 110 may identify a host associated with the second user account. For example, at step 215, client authentication computing platform 110 may determine that the second user account is hosted by a second organization different from a first organization that hosts the first user account. For instance, client authentication computing platform 110 may determine that the second user account is hosted by a second financial institution different from a first financial institution which hosts the first user account and which operates client authentication computing platform 110, account portal computing platform 120, and/or enterprise server infrastructure 125.

At step 216, client authentication computing platform 110 may route the second federated login request (e.g., to the host associated with the second user account). For example, at step 216, based on determining that the second user account is hosted by the second organization different from the first organization that hosts the first user account, client authentication computing platform 110 may route the second federated login request comprising the second user identification information associated with the second user account to an authentication server associated with the second organization via the data hub platform (e.g., data hub platform 150). For instance, after receiving the second federated login request and determining that it should be processed by another bank, client authentication computing platform 110 may route the second federated login request to the other bank's authentication server via data hub platform 150. In addition, client authentication computing platform 110 may subsequently provide internal information that is associated with a user corresponding to the second user account and that is maintained by client authentication computing platform 110, account portal computing platform 120, and/or enterprise server infrastructure 125 to external application host platform 140 based on an authentication process completed by the other bank's authentication server and/or based on requests and/or other messages received from the other bank's authentication server and/or data hub platform 150.

Figure 7:
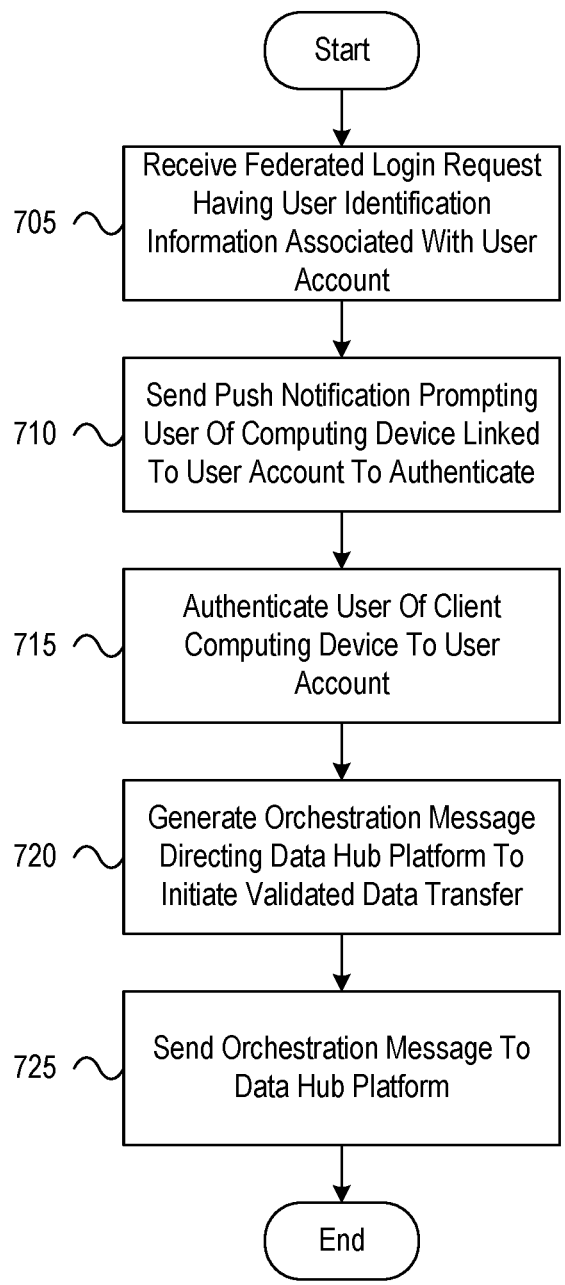
FIG. 7 depicts an illustrative method for utilizing federated user identifiers to enable secure information sharing in accordance with one or more example embodiments.

FIG. 7 depicts an illustrative method for utilizing federated user identifiers to enable secure information sharing in accordance with one or more example embodiments. Referring to FIG. 7, at step 705, a computing platform having at least one processor, a communication interface, and memory may receive, via the communication interface, from an external application host platform, a first federated login request comprising first user identification information associated with a first user account. At step 710, based on receiving the first federated login request comprising the first user identification information associated with the first user account, the computing platform may send, via the communication interface, to a first client computing device linked to the first user account, a first push notification prompting a user of the first client computing device to authenticate. At step 715, the computing platform may authenticate the user of the first client computing device to the first user account. At step 720, based on authenticating the user of the first client computing device to the first user account, the computing platform may generate an orchestration message directing a data hub platform to initiate a validated data transfer with the external application host platform. At step 725, the computing platform may send, via the communication interface, to the data hub platform, the orchestration message directing the data hub platform to initiate the validated data transfer with the external application host platform. In addition, by sending the orchestration message directing the data hub platform to initiate the validated data transfer with the external application host platform, the computing platform may cause the data hub platform to initiate a transfer of external information associated with the user of the first client computing device and maintained on at least one external data source server from the at least one external data source server to the external application host platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing platform comprising at least one processor, a communication interface, and memory:
receiving, by the at least one processor, via the communication interface, from an external application host platform, a first federated login request comprising first user identification information associated with a first user account;
based on receiving the first federated login request comprising the first user identification information associated with the first user account, sending, by the at least one processor, via the communication interface, to a first client computing device linked to the first user account, a first push notification prompting a user of the first client computing device to authenticate;
authenticating, by the at least one processor, the user of the first client computing device to the first user account;
based on authenticating the user of the first client computing device to the first user account, generating, by the at least one processor, an orchestration message directing a data hub platform to initiate a validated data transfer with the external application host platform;
sending, by the at least one processor, via the communication interface, to the data hub platform, the orchestration message directing the data hub platform to initiate the validated data transfer with the external application host platform, wherein sending the orchestration message directing the data hub platform to initiate the validated data transfer with the external application host platform causes the data hub platform to initiate a transfer of external information associated with the user of the first client computing device and maintained on at least one external data source server from the at least one external data source server to the external application host platform; and
after sending the orchestration message directing the data hub platform to initiate the validated data transfer with the external application host platform, initiate a transfer of internal information associated with the user of the first client computing device to the external application host platform,
wherein a first portion of the internal information associated with the user of the first client computing device is maintained on an account portal computing platform, and
wherein a second portion of the internal information associated with the user of the first client computing device is maintained on enterprise server infrastructure.

2. The method of claim 1, wherein sending the first push notification prompting the user of the first client computing device to authenticate causes the first client computing device linked to the first user account to present a notification prompting the user of the first client computing device to login to a mobile application associated with a client portal hosted by the account portal computing platform.

3. The method of claim 1, wherein authenticating the user of the first client computing device to the first user account comprises validating one or more of a username received from the user of the first client computing device, a password received from the user of the first client computing device, a one-time passcode received from the user of the first client computing device, biometric input received from the user of the first client computing device, or security question input received from the user of the first client computing device.

4. The method of claim 1, wherein sending the first push notification prompting the user of the first client computing device to authenticate causes the first client computing device linked to the first user account to present a notification prompting the user of the first client computing device to login to a client portal hosted by the account portal computing platform.

5. The method of claim 1, further including:
prior to generating the orchestration message directing the data hub platform to initiate the validated data transfer with the external application host platform, sending, via the communication interface, to the first client computing device linked to the first user account, a second push notification prompting the user of the first client computing device to consent to user-specific information being shared with the external application host platform.

6. The method of claim 1, wherein initiating the transfer of the internal information associated with the user of the first client computing device to the external application host platform comprises:
generating at least one command directing the account portal computing platform to send the first portion of the internal information associated with the user of the first client computing device to the external application host platform; and
sending, via the communication interface, to the account portal computing platform, the at least one command directing the account portal computing platform to send the first portion of the internal information associated with the user of the first client computing device to the external application host platform.

7. The method of claim 1,
wherein initiating the transfer of the internal information associated with the user of the first client computing device to the external application host platform comprises:
generating at least one command directing the enterprise server infrastructure to send the second portion of the internal information associated with the user of the first client computing device to the external application host platform; and
sending, via the communication interface, to the enterprise server infrastructure, the at least one command directing the enterprise server infrastructure to send the second portion of the internal information associated with the user of the first client computing device to the external application host platform.

8. The method of claim 1, wherein the internal information associated with the user of the first client computing device comprises entity verification data attesting to successful authentication of the user of the first client computing device to the first user account by the computing platform.

9. The method of claim 1, wherein the internal information associated with the user of the first client computing device comprises registered contact information associated with the user of the first client computing device.

10. The method of claim 1, wherein the internal information associated with the user of the first client computing device comprises account information associated with the user of the first client computing device.

11. The method of claim 1, wherein the internal information associated with the user of the first client computing device comprises historical information associated with the user of the first client computing device.

12. The method of claim 1, wherein the internal information associated with the user of the first client computing device comprises timing information associated with the user of the first client computing device.

13. The method of claim 1, further including:
after sending the orchestration message directing the data hub platform to initiate the validated data transfer with the external application host platform, updating a subscription database to indicate that user-specific data associated with the first user account has been shared with the external application host platform.

14. The method of claim 13, wherein updating the subscription database to indicate that the user-specific data associated with the first user account has been shared with the external application host platform causes the account portal computing platform to provide at least one subscription manager interface to the first client computing device.

15. The method of claim 14, wherein the at least one subscription manager interface provided to the first client computing device comprises a user-selectable option to revoke access to the user-specific data associated with the first user account from the external application host platform.

16. The method of claim 1, further including:
receiving, via the communication interface, from the external application host platform, a second federated login request comprising second user identification information associated with a second user account;
determining that the second user account is hosted by a second organization different from a first organization that hosts the first user account; and
based on determining that the second user account is hosted by the second organization different from the first organization that hosts the first user account, routing the second federated login request comprising the second user identification information associated with the second user account to an authentication server associated with the second organization via the data hub platform.

17. One or more non-transitory computer-readable media storing instructions that, when executed by a computing platform comprising at least one processor, a communication interface, and memory, cause the computing platform to:
receive, via the communication interface, from an external application host platform, a first federated login request comprising first user identification information associated with a first user account;
based on receiving the first federated login request comprising the first user identification information associated with the first user account, send, via the communication interface, to a first client computing device linked to the first user account, a first push notification prompting a user of the first client computing device to authenticate;
authenticate the user of the first client computing device to the first user account;
based on authenticating the user of the first client computing device to the first user account, generate an orchestration message directing a data hub platform to initiate a validated data transfer with the external application host platform;
send, via the communication interface, to the data hub platform, the orchestration message directing the data hub platform to initiate the validated data transfer with the external application host platform, wherein sending the orchestration message directing the data hub platform to initiate the validated data transfer with the external application host platform causes the data hub platform to initiate a transfer of external information associated with the user of the first client computing device and maintained on at least one external data source server from the at least one external data source server to the external application host platform; and
after sending the orchestration message directing the data hub platform to initiate the validated data transfer with the external application host platform, initiate a transfer of internal information associated with the user of the first client computing device to the external application host platform,
wherein a first portion of the internal information associated with the user of the first client computing device is maintained on an account portal computing platform, and
wherein a second portion of the internal information associated with the user of the first client computing device is maintained on enterprise server infrastructure.

18. The one or more non-transitory computer-readable media of claim 17, wherein sending the first push notification prompting the user of the first client computing device to authenticate causes the first client computing device linked to the first user account to present a notification prompting the user of the first client computing device to login to a mobile application associated with a client portal hosted by the account portal computing platform.

19. The one or more non-transitory computer-readable media of claim 17, wherein sending the first push notification prompting the user of the first client computing device to authenticate causes the first client computing device linked to the first user account to present a notification prompting the user of the first client computing device to login to a client portal hosted by the account portal computing platform.

20. The one or more non-transitory computer-readable media of claim 17, wherein the internal information associated with the user of the first client computing device comprises entity verification data attesting to successful authentication of the user of the first client computing device to the first user account by the computing platform.

* * * * *